(12) United States Patent
Jyoti (10) Patent No.: US 8,126,122 B2
(45) Date of Patent: Feb. 28, 2012

(54) CONTROLLING DATA RATE OF A FACSIMILIE TRANSMISSION

(75) Inventor: Anand Basalingappa Jyoti, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 1374 days.

(21) Appl. No.: 11/690,712

(22) Filed: Mar. 23, 2007

(65) Prior Publication Data

US 2008/0019492 A1    Jan. 24, 2008

(30) Foreign Application Priority Data

Mar. 28, 2006  (IN) .............................. 835/DEL/2006

(51) Int. Cl.
*H04M 11/00*    (2006.01)
(52) U.S. Cl. ......... 379/100.01; 379/100.06; 379/100.12; 379/100.17
(58) Field of Classification Search ............. 379/100.01, 379/100.06, 100.12, 100.17, 90.01; 375/222; 358/1.15, 434, 435, 438, 439
See application file for complete search history.

(56) References Cited

U.S. PATENT DOCUMENTS

| | | | | |
|---|---|---|---|---|
| 5,351,134 A | * | 9/1994 | Yaguchi et al. | 358/435 |
| 5,473,691 A | * | 12/1995 | Menezes et al. | 713/161 |
| 7,355,735 B1 | * | 4/2008 | Sivan et al. | 358/1.15 |
| 7,396,309 B2 | * | 7/2008 | Heitz et al. | 475/215 |
| 7,450,147 B2 | * | 11/2008 | Whited et al. | 348/14.01 |

* cited by examiner

*Primary Examiner* — Melur Ramakrishnaiah
(74) *Attorney, Agent, or Firm* — Blakely, Sokoloff, Taylor & Zafman LLP (57) ABSTRACT

A network device to control a transmission rate of one or more fax data units transferred between a transmitting and a receiving network device. The transmission rate is controlled based on one or more control parameters. The control parameters may be generated based on comparing the configured values and the capability values. The configured values may represent allowable transmission characteristics of a network path provisioned between a transmitting and a receiving network device and the capability values may represent the transmission capabilities of the transmitting and the receiving network device.

28 Claims, 5 Drawing Sheets

CONTROLLING DATA RATE OF A FACSIMILIE TRANSMISSION

This application claims priority to Indian Application Number 835/DEU2006 filed Mar. 28, 2006.

BACKGROUND

A network generally refers to a group of interconnected wired and/or wireless medium devices such as laptops, desktops, mobile phones, servers, fax machines, printers that may share resources. A fax machine may send data to another fax machine over a circuit switched network and/or a packet network. The data sent by a fax machine may depend on, for example, the capability of the fax machines and quality of the network. The fax machines may use the maximum rate supported by the circuit switched network.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes a network device used for controlling bit rate of facsimile transmission over packet networks. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
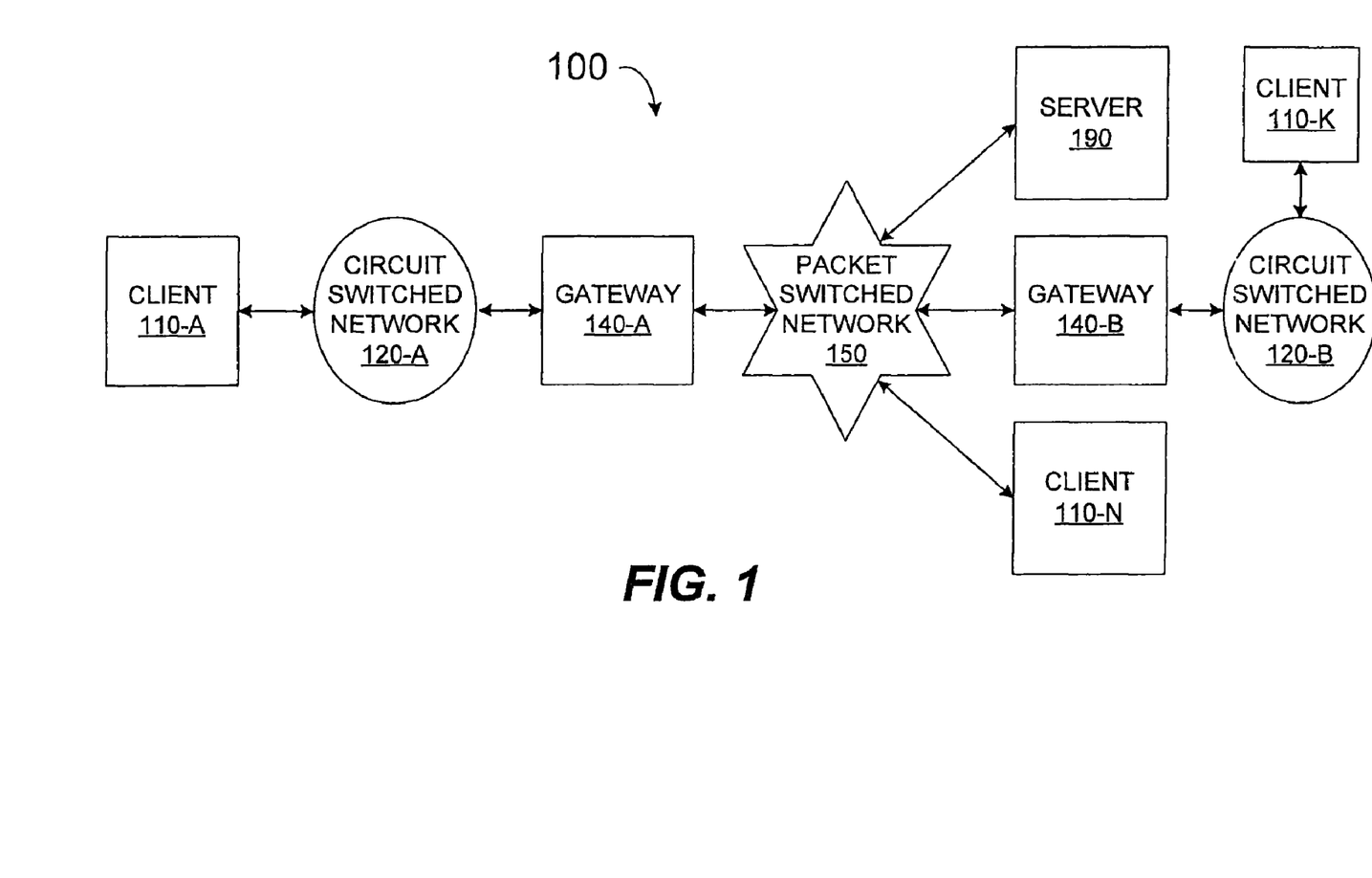
FIG. 1 illustrates an embodiment of a network environment.

An embodiment of a network environment 100 is illustrated in FIG. 1. The network environment 100 may comprise network devices such as a client 110-A, 110-K, and 110-N, a circuit switched network 120-A and 120-B, a gateway 140-A and 140-B, a packet switched network 150, and a server 190. For illustration, the network environment 100 is shown comprising a small number of each type of network devices. However, a typical network environment may comprise a large number of each type of such network devices.

The client 110 may comprise a fax machine a G3fax machine such as clients 110-A and 110-K or an internet aware fax machine (IAF) such as a client 110-N. The clients 110 may comprise various hardware, software, and firmware components to generate and send fax data to another fax machine. The client 110-A and 110-K may be, respectively, coupled to the circuit switched network 120-A and 120-B and the client 110-N may be coupled to the packet switched network 150. The clients 110 may, for example, support T.30, T.38 suite of protocols, TCP/IP or UDP/IP and such other protocols.

The server 190 may comprise a computer system capable of generating response corresponding to a request received from another network device such as the gateway 140-A and 140-B. The server 190 may be coupled to the packet switched network 150 via wired or wireless network. In one embodiment, the server 190 may be configured with one or more configuration values such as a maximum bit rate (MBR) value and a maximum bandwidth value. The server 190 may send the configuration values in response to a request received from the gateways 140-A and 140-B. The server 190 may comprise a web server, a transaction server, a database server, or any such systems.

The circuit switched network 120-A and 120-B may support transfer of fax data between the clients 110 by having a dedicated circuit established for the transfer of data. In one embodiment, the circuit switched network 120-A and 120-B may comprise a public old telephone service (POTS), public switched telephone network (PSTN) and such other networks. In one embodiment, the circuit switched network 120-A and 120-B may support ITU-T Rec. T.30 Fax protocol suite.

The packet switched network 150 may comprise one or more intermediate devices such as switches and routers, which may receive, process, and send the fax data to an appropriate intermediate device or an end device. The packet network 150 may enable end systems such as the clients 110 and the server 190 to transmit and receive data. The intermediate devices of the network 150 may support various protocols suites such as TCP/IP, asynchronous transfer mode (ATM), and T.38 Fax protocol suite defined by International Telecommunication Union-Telecommunication Standardization Sector (ITU-T).

The gateway 140-A and 140-B may contain devices such as protocol translators, rate converters, or signal translators to provide system interoperability. The gateways 140-A and 140-B may establish mutually acceptable administrative procedures between the circuit switched network 120 and the packet switched network 150. The gateway 140 may perform the required protocol conversions thus enabling transfer of messages between the clients 110. The gateways 140-A and 140-B may support protocols suites such as the TCP/IP, H.323, and T.38.

In one embodiment, the gateway 140 may control the transmission of fax data based on one or more control parameters. In one embodiment, the control parameters may be generated based on the configured values such as the maximum bit rate (MBR) value. In one embodiment, the maximum bit rate values may be provided, by a service provider, based on the service level requirements provided by users of the client 110. In one embodiment, the gateway 140 may comprise Intel® IXP 425® processor for processing fax data.

Figure 2:
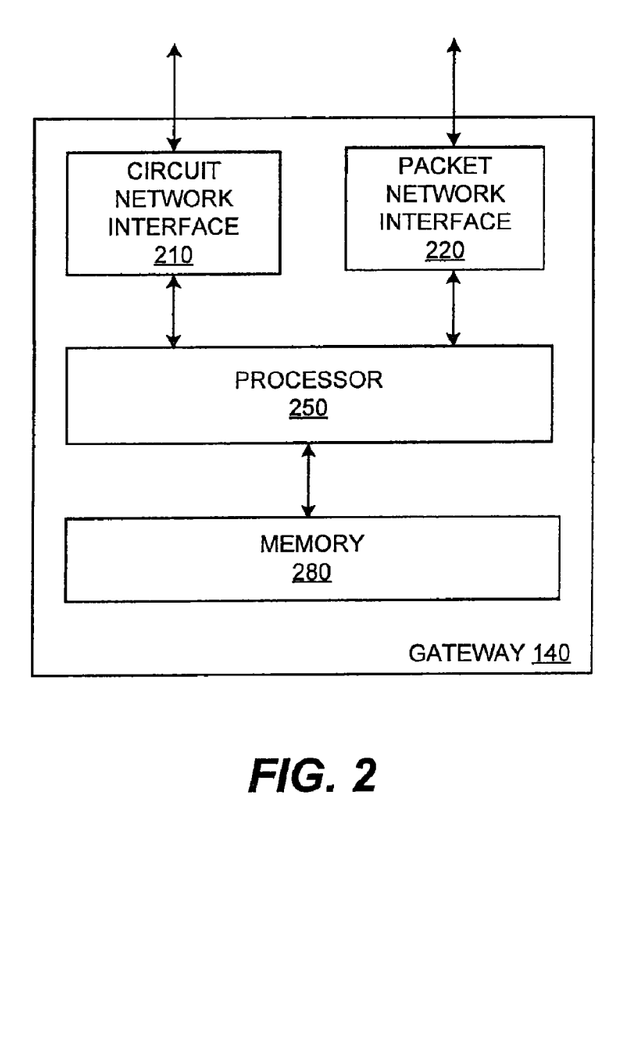
FIG. 2 illustrates an embodiment of a network device of the network environment of FIG. 1.

An embodiment of the gateway 140 is illustrated in FIG. 2. The gateway 140 may comprise a circuit network interface 210, a packet network interface 220, a processor 250, and a memory 280.

The circuit network interface 210 may provide an interface for the gateway 140-A to transfer fax data units to and from circuit switched network 120-A coupled to the gateway 140-A. The circuit network interface 210 may receive one or more fax data units from the circuit switched network 120-A, send the corresponding fax data units to the processor 250 for further processing. The circuit network interface 210 may receive fax data units from the processor 250 that may be directed to the client 110-A and forward the fax data units to the circuit switched network 120-A. The circuit network interface 210 may provide physical, electrical, and protocol interfaces to transfer fax data units between the circuit switched network 120-A and the gateway 140-A.

The packet network interface 220 may provide an interface for the gateway 140-A to transfer fax data units to and from packet switched network 150 coupled to the gateway 140-A. For example, the packet network interface 210 may receive one or more fax data units from the packet switched network 150 and send the corresponding fax data units to the processor 250 for further processing. The packet network interface 220 may receive fax data units directed to the client 110-K or 110-N and forward the fax data units to the packet switched network 150. The packet network interface 210 may provide physical, electrical, and protocol interfaces to transfer fax data units between the packet switched network 150 and the gateway 140-A.

The memory 280 may store the fax data units and instructions that may be used by the processor 250 to process the fax data units. In one embodiment, the memory 280 may store fax data units, look-up tables, data structures that enable the processor 250 to process the fax data units. In one embodiment, the memory 280 may comprise storage elements to store, for example, bit rates supported by each client and a table comprising modulation schemes and the corresponding data rates. In one embodiment, the memory 280 may comprise a dynamic random access memory (DRAM) and a static random access memory (SRAM).

The processor 250 may control the data rate of the fax data units based on the configured values. In one embodiment, the processor 250 may support, for example, communication and control modules. In one embodiment, the processor 250 may support a session initiation protocol (SIP) client module to send a request, over the packet network interface 220, to extract the configured values. The SIP client may, in response, receive the configured values and send a service data packet (SDP), comprising the configured parameters, to the control module.

For example, the client 110-A may send a page to the client 110-K. In one embodiment, the processor 250 may receive signaling frames exchanged between the client 110-A and 110-K during a capability negotiation phase and extract one or more capability values. The processor 250 may generate control parameters that may modify the capability values based on a comparison between the capability values and the configuration values, and may control the data rate of the fax data units based on the modified capability values.

Figure 3:
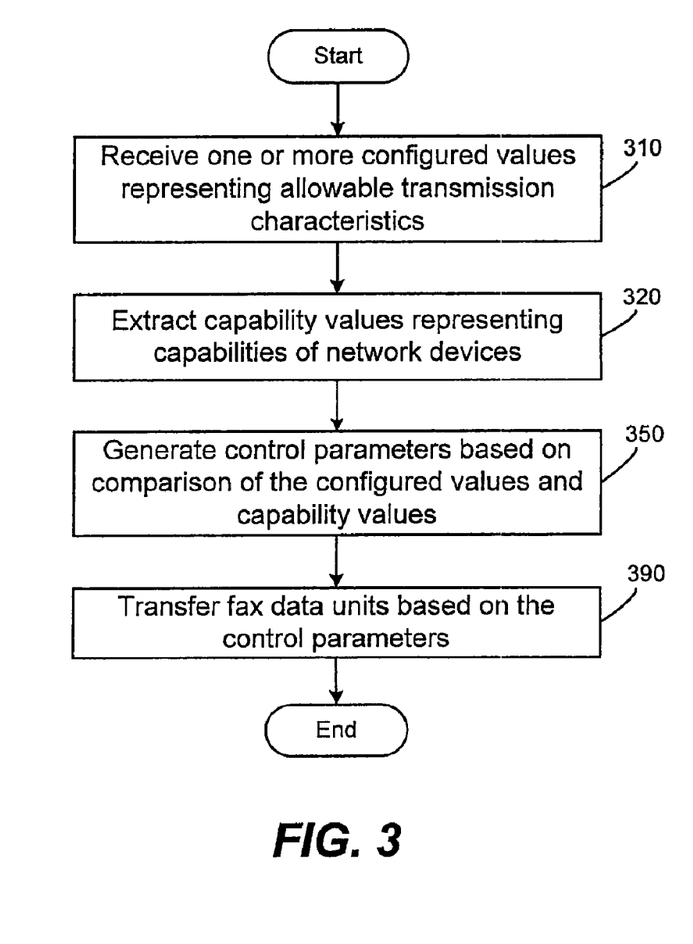
FIG. 3 illustrates an embodiment of an operation of the network device of FIG. 2.

An embodiment of the operation of the gateway 140 is depicted in FIG. 3. In block 310, the gateway 140-A may receive the configured values representing allowable transmission characteristics such as the maximum bit rate values, allowable bandwidth. In one embodiment, the user of the clients may choose service level requirements provided by a service provider and the service provider may configure the server 190 with the configuration values. The gateway 140 may send a request over the packet network interface 220 and receive, in response, the configured values.

In block 320, the gateway 140 may extract the capability values that represent the capabilities of the clients 110. In one embodiment, the gateway 140 may examine the frames sent by each client, for example, the client 110-A that is transmitting and the client 110-K that is receiving. The capability values may represent the modulation schemes such as V.21, V.29, and/or V.17 used by the clients 110-A and 110-K. In one embodiment, the modulation schemes may correspond to a specific bit rate such as 2400, 4800, 9600, 12000, and 14400 bits/sec.

In block 350, the gateway 140-A may generate the control parameters based on comparison of the capability values and the configured values. In one embodiment, the gateway 140-A may extract the capability values, for example, from the signaling frames sent by the clients 110-A and 110-K. In one embodiment, the gateway 140-A may generate the control values if the capability values, sent by the clients 110-A and 110-K, are greater than the configured values. In one embodiment, the control parameters may represent the modified capability values that may be generated based on the comparison of the capability values and the configured values.

In block 380, the gateway 140-A may transfer the fax data units based on the control parameters generated in block 350. In one embodiment, the gateway 140-A may support controlling the data rate of the fax data units based on the configured values. Such an approach may allow the service providers to provide differentiated service levels to the users of the network resources.

Figure 4:
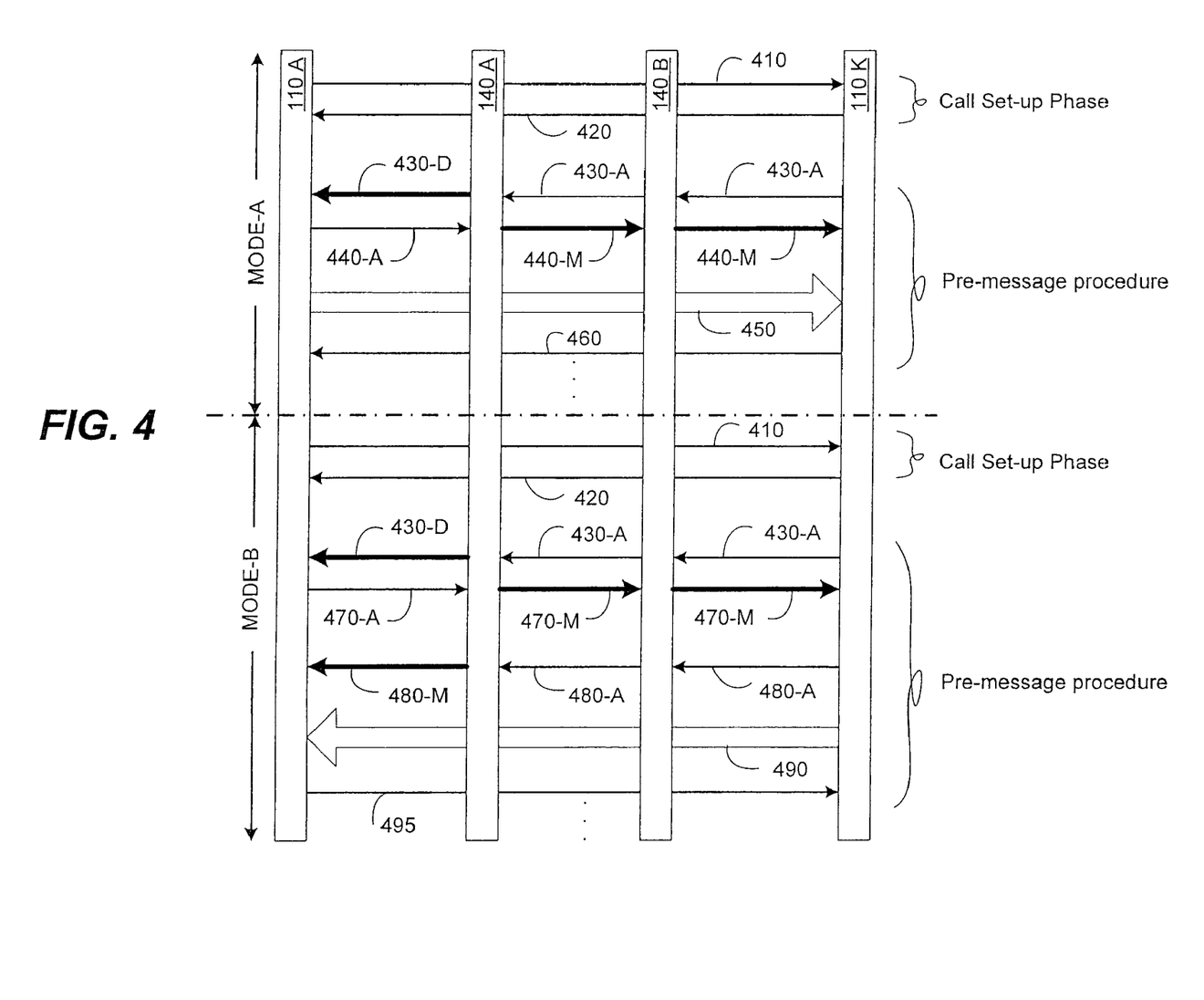
FIG. 4 illustrates a signaling diagram depicting the signals between fax machines.

An embodiment of signaling between the clients 110 is depicted in FIG. 4. Initially, before the call is switched to a fax mode, the client 110-A may call the gateway 140-A using the local telephone number of the gateway 140-A and the client 110-A may provide the telephone number of the client 110-K to the gateway 140-A. The gateway 140-A may determine that the client 110-K is coupled to the gateway 140-B and may provide the telephone number of the client 110-K to the gateway 140-B. The gateway 140-B may establish connection with the client 110-K using the telephone number of the client 140-K. In one embodiment, the gateways 140-A and 140-B may communicate using H.

In one embodiment, the clients 110-A and 110-K may operate in Mode-A or Mode-B. In Mode-A, the client 110-A transmits and the client 110-K receives. In Mode-B, the client 110-A calls and may also wish to receive from the client 110-K. During the call set-up phase in the Mode-A and Mode-B, the client 110-A may then send a calling tone CNG410 to the client 140-K and may receive, in response, an answering tone CED420. In one embodiment, the call may be switched to a fax mode after detecting the CNG410 and the CED420 signal. The gateways 140-A and 140-B may use protocol suites such as a T.30, T.38 during the fax mode operation.

In one embodiment, while operating in Mode-A, the client 110-A may generate a digital command signal DCS440-A in response to receiving a digital identification signal DIS430-D during the capability negotiation phase. In one embodiment, the client 110-A may send the DCS440-A comprising the capability values of the client 110-A. In one embodiment, the gateway 140-A may extract the capability values from the DCS440-A and generate the control values based on the comparison of the capability values with the configured values. The gateway 140-A may modify the capability values based on the control values and then send a modified DCS440-M onward. The client 110-A may send a training check sequence TCF450 and may start to transmit fax data units after receiving a confirmation to receive CFR460.

In another embodiment, the gateway 140-A, may modify a CFR460, received from the client 110-K, to a failure to transmit signal (FTF) and send a FTF to the client 110-A, if the capability values of the client 110-K exceed the configured values. The client 110-A may respond with a retrain signal comprising new capability parameters. The FTF signals may be sent, repeatedly, by the gateway 140-A until the new capability values of the clients 110-A and 110-K satisfy the configured parameters.

The client 110-K may send a digital identification signal DIS430-A to the gateway 140-B. In one embodiment, the DIS430-A may comprise the capability values representing, for example, the modulation scheme such as V.27 fall back, V.27, V.29, and V.17 supported by the client 140-K. The gateway 140-B may forward the DIS430-A to the gateway 140-A. In one embodiment, the gateway 140-A may extract the capability values from the DIS430-A and compare the capability values with the configured values. The gateway 140-A may generate control values based on the comparison of the capability values and the configured values and modify the capability values based on the control values before sending the modified DIS430-D to the gateway 140-A. The gateway 140-A may send the modified DIS430-D to the client 110-A. In other embodiment, the gateway 140-B may modify the DIS430-A and send a modified DIS430-D to the gateway 140-A and the gateway 140-A may forward the DIS430-D to the client 110-A.

While operating in a capability negotiation phase of Mode-B, the client 110-A may generate a digital transmit command DTC470-A in response to receiving the digital identification signal DIS430-D from the gateway 140-A. In one embodiment, the client 110-A may send the DTC470-A comprising the capability values of the client 110-A. The gateway 140-A may extract the capability values from the DTC470-A and generate one or more control values based on the comparison of the capability values with the configured values. The gateway 140-A may modify the capability values based on the control values before sending the modified DTC470-M onward. The client 110-A may receive a DCS480-M generated by the gateway 140-A after the gateway 140-A modifies the capability values embedded in DCS480-A. The client 110-A may then receive a TCF490 from the client 110-K and, in response to receiving the TCF490, the client 110-A may send a confirmation CFR495 indicating readiness to receive the fax data units.

The client 110-K may send the DIS430-A to the gateway 140-A via the gateway 140-B and the gateway 140-A may process the DIS430-A as described above. The client 110-K may then send the DCS480 and the TCF490 in response to receiving the DTC470-M. The client 110-A may start receiving the fax data units, based on the control values of DTC470-M, after sending the CFR 495.

In another embodiment, the gateway 140-A may send a failure to transmit signal (FTF) signal to the client 110-K after receiving the CFR495 from the client 110-A. The client 110-K may respond with a retrain sequence comprising new capability parameters. The FTF signals may be sent, repeatedly, by the gateway 140-A until the new capability values of the clients 110-A and 110-K satisfy the configured parameters.

Figure 5:
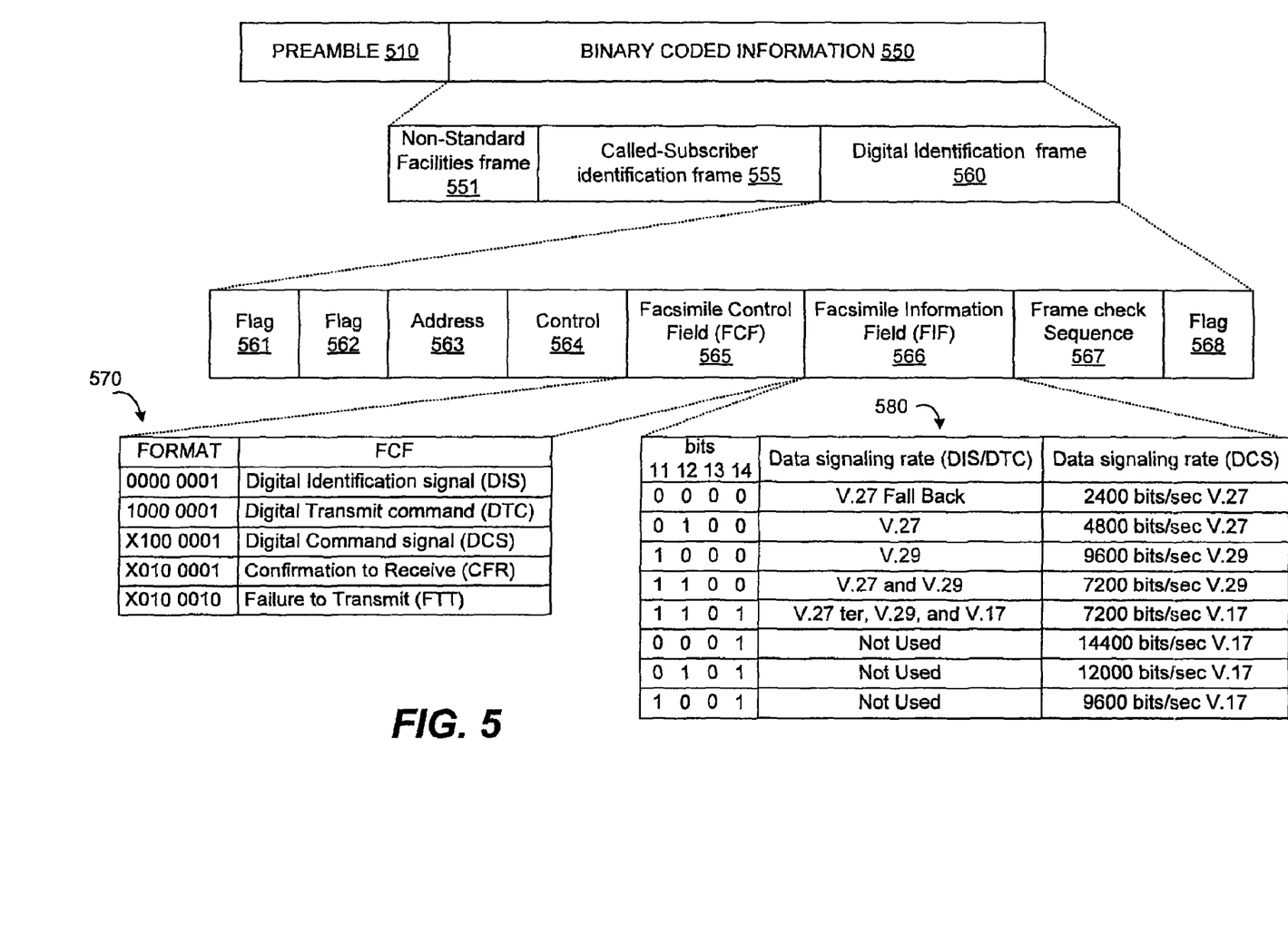
FIG. 5 illustrates packet formats used to send signals depicted in FIG. 4

An embodiment of a format of the DIS signal, DCS signal, and the DTC signal is depicted in FIG. 5. In one embodiment, the client 110-A and 110-K may use a high level data link control (HDLC) frame structure described in Sec 5.3 of "Procedures for document facsimile transmission in the general switched telephone network" under Series-T: Service for telematic services provided by ITU-T, T.30 (July 2003). The binary coded signals and format may comprise a preamble 510 and binary information 550. The binary information 550 may comprise a non-standard facilities frame 551, a called-subscriber identification frame 555, and a digital Identification frame 560. The digital identification frame 550 may further comprise Flags561, 562, and 568, Address563, Control564, facsimile control field FCF565, facsimile information field FIF566, and frame check sequence 567.

The Address563 may equal 8-bit HDLC address that may be used to provide identification of a specific terminal sending the signaling frame. In one embodiment, Address563 may equal 00000001 to uniquely identify the client 110-A as the sender of the frame and 00000010 to uniquely identify the client 110-K as the sender of the frame. The FCF565 may equal 8 or 16 bits. In one embodiment, a table 570 depicts some of the values that FCF565 may comprise. For example, the Address563 may equal 00000010 and FCF565 may equal 00000001 to indicate that the frame represents a DIS signal sent by the client 110-K. The FCS565 may equal 10000001, X1000001, X0100001, and X0100010 to indicate that the frame represents a DTC, DCS, CFR, and FTT frames described above.

The bits 11-14 of FIF566 may represent the data signaling rate. In one embodiment, a table 580 depicts some of the values to which the bits 11-14 of FIF566 may be configured. In one embodiment, a DIS/DTC frame may comprise 0000, 0100, 1000, 1100, or 1101 representing a modulation scheme V.27 Fall Back, V.27, V.29, V.27 and V.29, or V.27 ter, V.29 and V.17 respectively in bits 11-14 of FIF566. In one embodiment, a DCS frame may comprise 0000, 0100, 1000, 1100, or 1101, 0001, 0101, or 1001 representing a data rate of 2400, 4800, 9600, 7200, 7200, 14400, 1200, and 9600 bits/second respectively, in bits 11-14 of FIF566.

In one embodiment, the client 110-K may generate a frame F1 comprising a 00000010, 00000001, and 0100 in the Address563, the FCS565, and the bits 11-14 of the FTF566 respectively. The frame F1 may represent the DIS430-A generated by the client 110-K having a capability to receive the fax data units at a data rate corresponding to V.27 modulation. In one embodiment, the V.27 modulation scheme may correspond to a data rate of 4800 bits/sec. The gateway 140-B may receive the frame F1 and compare the capability value 4800 bits/sec with the configured values such as the MBR value equaling, for example, 2400 bits/sec.

The gateway 140-B may then generate a control value equaling 0000, which corresponds to V.27 Fall Back modulation scheme. In one embodiment, the V.27 Fall Back modulation scheme may correspond to a bit rate of 2400 bits/sec. The gateway 140-B may modify the bits 11-14 of the frame F1 to equal 0000 before sending a modified frame MF1 corresponding to the DIS430-D to the client 110-A. Similarly, a DTC/DCS frame received from the client 110-A may be processed before sending the frames to the client 110-K.

Figure 6:
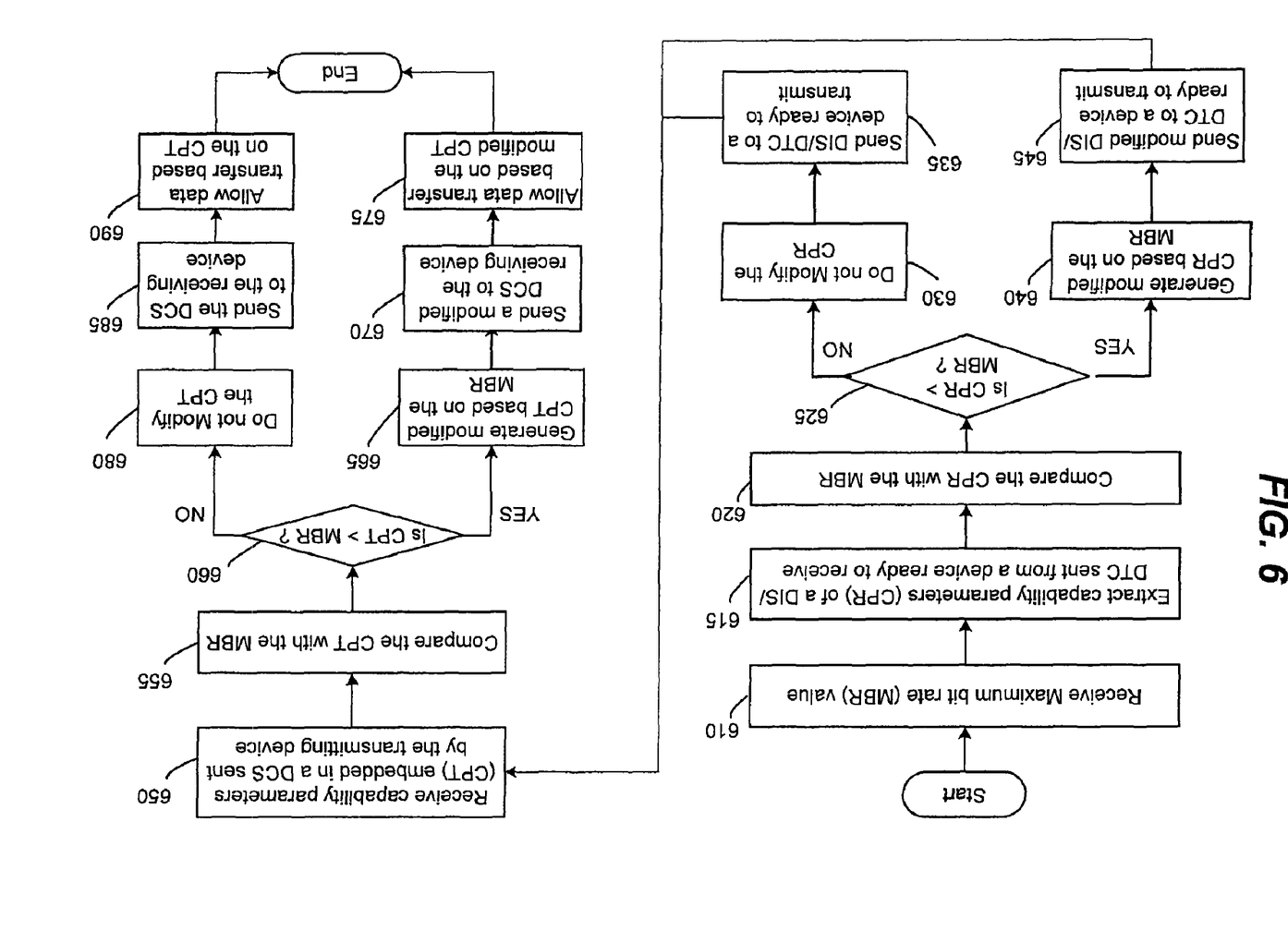
FIG. 6 illustrates an embodiment of the operation of the network device using the signaling frames described in FIG. 5.

An embodiment of an operation of the gateway 140 using format of FIG. 5 is described in FIG. 6. In block 610, the processor 250 may receive the maximum bit rate (MBR) value as the configured value. In block 615, the processor 250 may extract capability parameters (CPR) of a DIS/DTC frame sent from a device ready to receive the fax data units.

In block 620, the processor 250 may compare the CPR with the MBR. In block 625, the processor 250 may determine if CPR is greater than the MBR and causes control to pass to block 640 is the condition is true and to block 630 otherwise.

In block 630, the processor 250 may not modify the CPR values. In block 635, the processor 250 may send the DIS/DTC frame onward to a device ready to transmit. In block 640, the processor 250 may generate modified CPR values based on the MBR. In block 645, the processor 250 may send a modified DIS/DTC frame comprising modified CPR values to the device ready to transmit.

In block 650, the processor 250 may receive capability parameters (CPT) embedded in a DCS frame sent by the transmitting device. In block 655, the processor 250 may compare the CPT with the MBR. In block 660, the processor 660 may determine if the CPT is greater than the MBR and may cause control to pass to block 665 if the condition is true and to block 680 otherwise.

In block 665, the processor 250 may generate modified CPT based on the MBR values. In block 670, the processor 250 may send a modified DCS, comprising the modified CPT, to the receiving device. In block 675, the processor 250 may allow the client device to transfer fax data units based on the modified CPT values.

In block 680, the processor 250 may not modify the CPT. In block 685, the processor 250 may send the DCS to the receiving device. In block 690, the processor 250 may allow the client device to transfer fax data units based on the CPT values.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
receiving configured values, in a gateway provisioned between a transmitting fax device and a receiving fax device, wherein the configured values include a maximum bit rate value, wherein the maximum bit rate value is stored in a server,
extracting capability values from a frame exchanged between the transmitting fax device and the receiving fax device,
generating control parameters based on a comparison of the configured values and the capability values, wherein the control parameters are used to generate modified capability values if the capability values are greater than the maximum bit rate, and
controlling a transmission rate of one or more fax data units transferred between the transmitting and the receiving fax device based on the modified capability values.

2. The method of claim 1, wherein the modified configured values represent a maximum bit rate at which the one or more fax data units are allowed to be transmitted over the network path provisioned between a first and a second gateway, respectively, coupled to the transmitting fax device and the receiving fax device.

3. The method of claim 1, wherein the capability values of the network devices are embedded in a frame sent, during a capability negotiation phase, by the transmitting fax device and the receiving fax devices.

4. The method of claim 3, wherein the frame comprises a first signal comprising the capability values of the receiving fax device, wherein the first signal is sent by the receiving fax device during the capability negotiation phase.

5. The method of claim 3 comprises adding a second signal to the frame after the frame is received in the transmitting fax device, wherein the second signal comprises the capability values of the transmitting fax device, wherein the second signal is sent by the transmitting fax device, during the capability negotiation phase, in response to receiving the frame sent by the receiving fax device.

6. The method of claim 1, wherein the capability values comprise modulation schemes, with each modulation scheme corresponding to a specified bit rate.

7. The method of claim 1 generating the control values further comprise,
comparing the capability values of the receiving fax device and the configured values, and
modifying the capability values of the receiving fax device to match the configured values if the capability values of the receiving fax device is greater than the configured values and not modifying the capability values otherwise.

8. The method of claim 1 generating the control values further comprise,
comparing the capability values of the transmitting fax device and the configured values, and
modifying the capability values of the transmitting fax device to match the configured values if the capability values of the transmitting fax device is greater than the configured values and not modifying the capability values otherwise.

9. The method of claim 1, wherein the configured values are provided by a service provider based on the service level requirements provided by a user of the transmitting and the receiving fax devices.

10. An apparatus comprising
a memory,
a packet network interface to support interface with a packet network,
a circuit network interface to support interface with a circuit network, and
a processor to,
receive configured values, wherein the configured values include a maximum bit rate value, wherein the maximum bit rate value is stored in a server, extract capability values from a frame exchanged between a transmitting fax device and the receiving fax device, generate control parameters based on a comparison of the configured values and the capability values, wherein the control parameters are used to generate modified capability values if the capability values are greater than the maximum bit rate, control transmission rate of one or more fax data units transferred by a gateway based on the modified capability values.

11. The apparatus of claim 10, wherein the modified configured values represent a maximum allowable bandwidth for the one or more fax data units transmitted between the transmitting and the receiving fax devices.

12. The apparatus of claim 10, wherein the capability values of the transmitting and the receiving network devices are embedded in a frame sent, during a capability negotiation phase, between the transmitting fax device and the receiving fax device.

13. The apparatus of claim 12, wherein the processor receives an identification frame comprising the capability values of the receiving fax device, which is sent by the receiving fax device during the capability negotiation phase.

14. The apparatus of claim 12, wherein the processor receives a transmit frame comprising the capability values of a transmitting fax device that is ready to receive the fax data units and the transmit frame is sent by the transmitting fax device, during the capability negotiation phase, in response to receiving the identification frame sent by the receiving network device.

15. The apparatus of claim 12, wherein the frame comprises a command frame comprising the capability values of the transmitting fax device sent by the transmitting fax device, during the capability negotiation phase, in response to the identification frame sent by the receiving fax device.

16. The apparatus of claim 10, wherein the capability values comprise data rates corresponding to one or more modulation schemes.

17. The apparatus of claim 10 the processor to generate the control values comprise comparing the capability values of the receiving fax device and the configured values and modifying the capability values of the receiving fax device to match the configured values if the capability values of the receiving fax device is greater than the configured values.

18. The apparatus of claim 10 the processor to generate the control values, comprise comparing the capability values of the transmitting fax device and the configured values and modifying the capability values of the transmitting fax device to match the configured values if the capability values of the transmitting network device is greater than the configured values.

19. A machine readable medium comprising a plurality of instructions that in response to being executed result in a computing device receiving configured values, in a gateway provisioned between a transmitting fax device and a receiving fax device, wherein the configured values include a maximum bit rate value, wherein the maximum bit rate value is stored in a server, extracting capability values from a frame exchanged between the transmitting and the receiving network device, generating control parameters based on a comparison of the configured values and the capability values, wherein the control parameters are used to generate modified capability values if the capability values are greater than the maximum bit rate, controlling transmission rate of one or more data fax units transferred between the transmitting and the receiving network device based on the modified capability values.

20. The machine readable medium of claim 19, wherein the modified configured values represent a maximum bit rate at which the one or more data units are allowed to be transmitted over a network path provisioned between a first and a second gateway, respectively, coupled to the transmitting fax device and the receiving fax device.

21. The machine readable medium of claim 19, wherein the capability values of the network devices are embedded in a frame sent by the transmitting fax device during a capability negotiation phase.

22. The machine readable medium of claim 21, wherein the frame comprises a first signal comprising the capability values of receiving fax device, wherein the first signal is sent by the receiving fax device during the capability negotiation phase.

23. The machine readable medium of column 21 comprises adding a second signal to the frame after the frame is received in the transmitting fax device, wherein the second signal comprises the capability values of a transmitting network device, wherein the second signal is sent by the transmitting network device, during the capability negotiation phase, in response to receiving the frame sent by the receiving network device.

24. The machine readable medium of claim 19 generating the control values further comprise, comparing the capability values of the receiving fax device and the configured values, and modifying the capability values of the receiving fax device to match the configured values if the capability values of the receiving network fax device is greater than the configured values.

25. The machine readable medium of claim 19 generating the control values further comprise, comparing the capability values of the transmitting fax device and the configured values, and modifying the capability values of the transmitting fax device to match the configured values if the capability values of the transmitting fax device is greater than the configured values.

26. A system comprising a first network device to transmit fax data units, a second network device to receive the fax data units, wherein the second network device is coupled to a second gateway, and a first gateway coupled to the first network device through a circuit network and to the second gateway through a packet network, wherein the first gateway to, control a transmission rate of one or more fax data units transferred between the first network device and the second network device based on control parameters generated by comparing configured values with capability values, wherein the configured values include a maximum bit rate value, extract capability values from a frame exchanged between the first and the second network devices, wherein the control parameters are used to generate modified capability values if the capability values are greater than the maximum bit rate.

27. The system of claim 26, wherein the first gateway to receive the configured values by sending a request to a server storing the configured values.

28. The system of claim 26, wherein the first gateway to supports one or more G3fax devices and one or more internet aware fax devices.

* * * * *

UNITED STATES PATENT AND TRADEMARK OFFICE
CERTIFICATE OF CORRECTION

| | | |
|---|---|---|
| PATENT NO. | : 8,126,122 B2 | Page 1 of 1 |
| APPLICATION NO. | : 11/690712 | |
| DATED | : February 28, 2012 | |
| INVENTOR(S) | : Jyoti | |

It is certified that error appears in the above-identified patent and that said Letters Patent is hereby corrected as shown below:

In the Claims

Claim 24, column 10, line 33 after, -- receiving -- delete "network".

Signed and Sealed this
First Day of April, 2014

Michelle K. Lee
*Deputy Director of the United States Patent and Trademark Office*